United States Patent [19]

Wheeler

[11] 4,303,424
[45] Dec. 1, 1981

[54] FILTER BAG APPARATUS HAVING AN IMPROVED FABRIC FILTER BAG TENSIONING APPARATUS

[75] Inventor: Louis B. Wheeler, Birmingham, Ala.

[73] Assignee: Combustion Engineering, Inc., Windsor, Conn.

[21] Appl. No.: 185,031

[22] Filed: Sep. 8, 1980

[51] Int. Cl.³ .............................................. B01D 46/02
[52] U.S. Cl. ...................................... 55/365; 55/378
[58] Field of Search ............... 55/365, 378; 210/323.2, 210/324

[56] References Cited

U.S. PATENT DOCUMENTS

| | | | |
|---|---|---|---|
| 2,014,298 | 9/1935 | Schneible | 55/378 |
| 2,948,058 | 8/1960 | Culkosky | 29/227 |
| 3,710,559 | 1/1973 | Harris et al. | 55/378 |
| 4,113,455 | 9/1978 | Richmond | 55/378 |

*Primary Examiner*—David L. Lacey
*Attorney, Agent, or Firm*—William W. Habelt

[57] ABSTRACT

A bag filter housing (10) having filter bag tensioning means for providing a predetermined tension on each filter bag (28). The tension may be quickly released by means of a lever (40) incorporated into the bag tensioning means thereby allowing the filter bags to be quickly removed and replaced as necessary to maintain optimum dust collection performance.

2 Claims, 4 Drawing Figures

FILTER BAG APPARATUS HAVING AN IMPROVED FABRIC FILTER BAG TENSIONING APPARATUS

BACKGROUND OF THE INVENTION

The present invention relates to a gas cleaning apparatus of the bag filter type that removes dust and other particulate matter from a gas stream by passing the gas through a porous fabric filter bag. More specifically, the present invention relates to a bag tensioning apparatus which is readily releasable to allow removal and replacement of the filter bags.

A typical baghouse filter is constructively a plurality of filter bags suspended in an enclosure termed a baghouse. Each filter bag is a cylindrically elongated porous fabric member having an open end which is attached to a tube sheet and a closed end which is suspended from a support beam. The filter bags and the tube sheet divide the baghouse into two chambers, one chamber comprising the space external to the bags and the other chamber comprising the space internal to the bags.

In operation, a gas laden with entrained solid particles is drawn through the baghouse. Entering through one chamber as dirty gas, the gas passes through the fabric filters to leave through the other chamber as a clean gas. As the gas flows through the fabric, the entrained solid particles being too large to pass through the pores of the fabric, collect on the surface of the fabric and are, thereby, filtered from the gas.

When suspended from the support beam, it is desirable that a predetermined amount of tension be placed on the bags so that the fabric of the bag is kept in a uniformly taut condition to ensure optimum collection efficiency. However, when the bags are subjected to service for even a short period of time, the filter cloth from which they are constructed collects a quantity of dust that sharply increases the pressure drop across the bags and increases their resistance to gas flow through the fabric. Inasmuch as these dust deposits must be periodically removed from the bags by shaking them or subjecting them to reverse air flow, the bags stretch, loosen, and wear until they are no longer taut; and their collecting efficiency is severely impaired. Thus, the bags must be replaced with new bags when they become excessively worn or when the fabric has deteriorated from repeated cleaning.

To provide for proper bag tensioning, the filter bags are typically suspended from the support beam by means of a spring biased threaded hanger rod which extends axially through the support beam and is pivotally connected to the closed end of the filter bag. A nut is threaded onto the hanger rod and tightened so as to compress the spring between the nut and the support beam until the desired tension on the bag is achieved. Although this apparatus is capable of providing proper and uniform pretensioning of the bags, removal of the bags is a laborious operation. When it is desired to remove the bags, the nut must be completely unthreaded so as to remove all tension on the bags. The bags may then be manually removed and new bags connected to the hanger rod. The nut must be then threaded back on to the rod and tighten down to again properly pretension the bags.

The present invention, therefore, has as its general objective to provide a bag tensioning apparatus of the spring biased threaded hanger rod type which permits the bags to be quickly removed and replaced without disassembly of the bag tensioning apparatus.

SUMMARY OF THE INVENTION

In accordance with the present invention, there is provided a novel and improved bag tensioning apparatus which is readily releasable so that the tension on the bags may be released without disassembly of the bag tensioning apparatus. The bag tensioning apparatus comprises a hanger rod extending axially from the closed end of each filter bag through an aperture in the bag support beam, spring means disposed about the hanger rod for biasing each hanger rod axially relative to the support beam, means for compressing the spring means so as to hold each filter bag in a taut condition under a predetermined tension load, and tension release means disposed about the hanger rod between the spring means and the support beam and operatable so that the compression on the spring means may be readily removed thereby releasing the tension on the bags and facilitating bag removal. Preferably, the tension release means comprise a lever having a slotted and substantially rectangular-shaped head with a lever arm extending therefrom. The slotted head of the lever is disposed about the hanger rod between the spring means and the support beam. The compression means are adjusted to compress the spring means and, thereby, bias the hanger rod relative to the support beam with the lever disposed about the hanger rod between the spring means and the support beam with the longer sides of the rectangular lever head disposed axially with respect to the hanger rod. When it is desired to release the tension on the bags, the lever arm is rotated so as to rotate the rectangular head of the lever such that the shorter sides of the rectangular head are disposed axially with respect to the hanger rod.

DESCRIPTION OF THE PREFERRED EMBODIMENT

Figure 1:
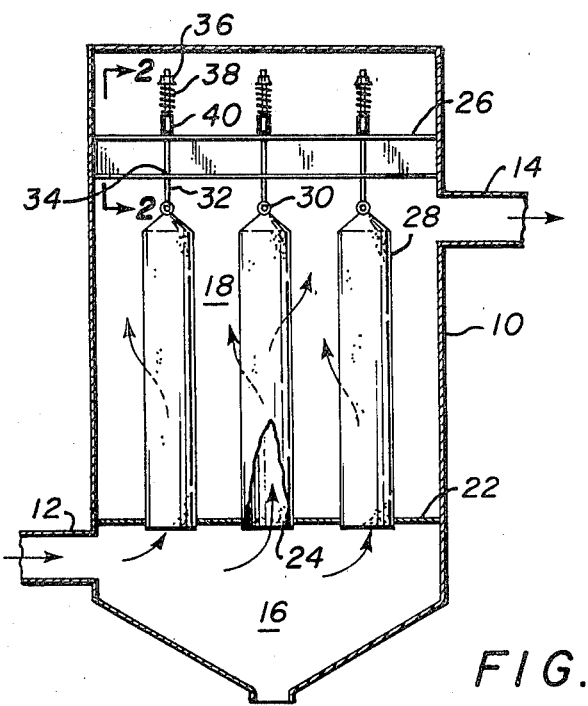
FIG. 1 is a side elevational view of a bag filter apparatus employing the bag tensioning apparatus of the present invention.
Figure 4:
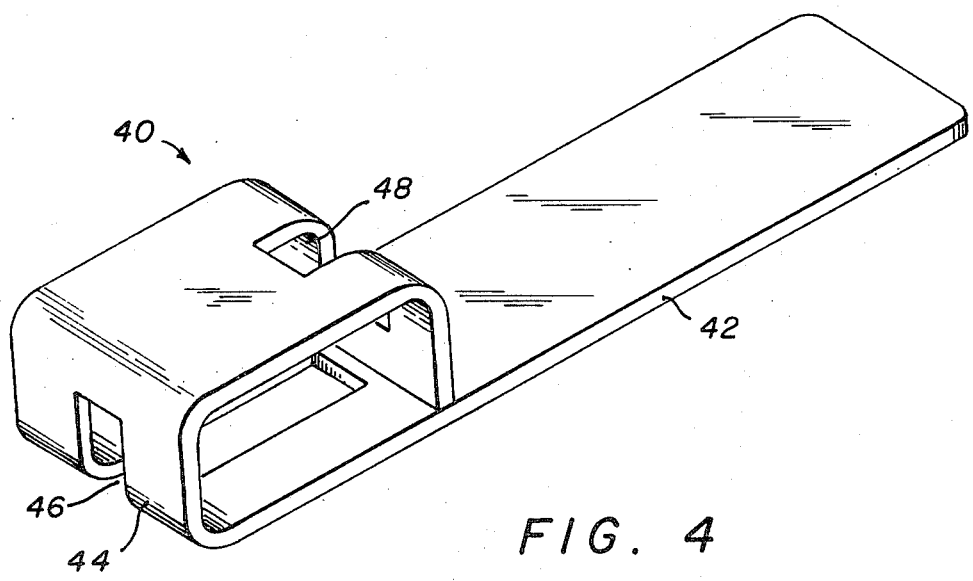
FIG. 4 is an isometric view of the preferred embodiment of the tension release means of the present invention.

The filter apparatus of the present invention comprises a baghouse filter having a housing 10 that encloses a filter chamber therein. The housing has an inlet 12 through which a particulate laden gas enters the filter chamber and an outlet 14 through which the clean gas exhausts therefrom. The filter chamber is divided into an inlet plenum 16 and an outlet plenum 18 by a tube sheet 22 which is provided with a series of openings 24 therein. The openings 24 are each surrounded by the open end of a tubular fabric filter bag 28, while the opposite end of each bag is closed and connected pivotally at 30 to a hanger rod 32 by which the bags 28 are suspended from a support beam 26. The bags 28 are formed from a porous fabric that permits clean gas to flow through the pores thereof while the entrained particles therein are captured on the fabric of the filter bags.

The hanger rod 32 extends axially from the closed end of each bag 28 through an aligned aperture 34 in the support beam 26. The support beam 26 lies traversely across the housing 10 and is firmly anchored in the sidewalls of the housing 10 whereby it provides a base that will support an axial force for holding the filter bags in an extended position. The term beam is meant herein to include other bag support devices known and commonly employed in the art such as a grid sheet.

The means for suspending the bags 28 under a predetermined tension from the support beam 26 comprises a spring means 38 surrounding the end of the hanger rod 32 that extends through the aperture 34 in the support beam 26. Compression means 36, shown herein as a nut threaded onto the end of the hanger rod 32, is adjusted to compress the spring 38 thereby biasing the hanger rod 32 with respect to the support beam 26 so as to provide a predetermined tension on the filter bags 28.

In accordance with the present invention, tension release means 40 is disposed about the hanger rod 32 between the spring means 38 and the support beam 26 so that the compression on the spring means 38 may be removed without disassembling the bag tensioning apparatus by adjusting the compression means 36. The compression on spring means 38 is set with the tension release means in its unreleased position by adjusting compression means 36 to provide the desired bias on the hanger rod 32 relative to the support beam 26 thereby placing the filter bags 28 under the desired predetermined tension. When it is necessary to remove and replace the filter bags 28, this may be done without disassembly of the bag tensioning apparatus merely by releasing the tension release means 40. When the tension release means 40 is released, the spring 38 returns to its uncompressed state; and the filter bags return to an untensioned state and may be readily removed from the hanger rods 32.

Figure 2:
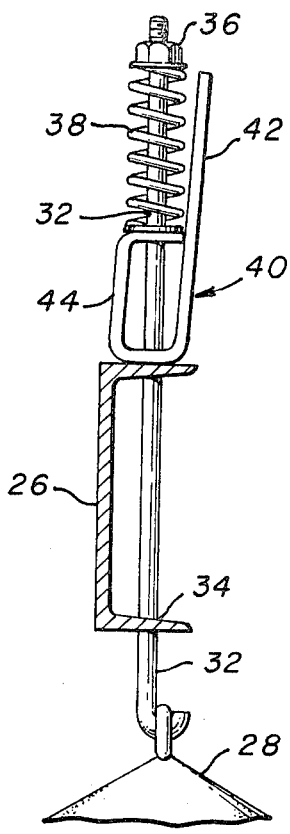
FIG. 2 is an enlarged view showing the details of the construction of the bag tensioning apparatus of the present invention taken along line 2—2 of FIG. 1 with the bags under tension.
Figure 3:
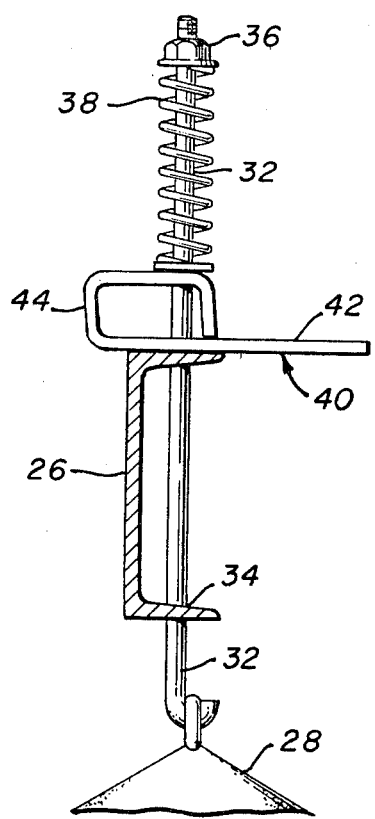
FIG. 3 is an enlarged view showing the details of construction of the bag tensioning apparatus of the present invention taken along line 2—2 of FIG. 1 with the tension on the bags released.

A preferred form of the invention, as best seen in FIGS. 2, 3, anf 4, comprises a lever having a slotted substantially rectangular-shaped head and a lever arm extending therefrom. The release means 40 is a lever formed of a rectangular thin strip bent in the shape of a small d, the lever arm 42 extending from the head 44. The head 44 is provided with slots 46 and 48 so that the lever 40 may be disposed about the hanger rod 32 and be movable with respect to the hanger rod 32 in a plane passing through the axis of the hanger rod 32.

The operation of the tension release lever 40 can be best described with reference to FIGS. 2 and 3. In FIG. 2, the tension release lever 40 is shown in its normal unreleased position, that is, the position it assumes when the filter bags 28 are under tension during normal operation. In this position, the tension release lever 40 is disposed with the long sides of its head 44 disposed axially with respect to the hanger tube 32 with the lever arm 42 extending outward from the lever head 44 along the hanger rod 32. As seen in FIG. 2, the tension release lever 40 is disposed about the hanger rod 32 as an upright d when the bags are being held under tension.

When it is desired to release the tension on the bags for their removal and replacement, the lever arm 42 is rotated so as to rotate the head 44 of the tension release lever 40 to a position where the short sides of the substantially rectangular head 42 are disposed axially with respect to the hanger rod 32. When in the released position, as shown in FIG. 3, the tension release lever 40 appears as a d lying on its side. After the tension release lever 40 has been released, the spring means 38 is released from compression thereby releasing the tension on the bags 28.

When the bags 28 have been replaced with new bags, the lever arm 42 of the tension release lever 40 is rotated so as to rotate the rectangular head 44 thereof back to an upright position such that the long sides of the head 44 are again disposed axially with respect to the hanger rod 32. In doing so, the spring means 38 is again compressed; and the new bags are now placed under the same tension that the old bags were under. Thus, the bags have been replaced without any disassembly of the bag tensioning apparatus.

While only one embodiment of the invention has been shown, it will be appreciated that modifications thereof may be readily made thereto by those skilled in the art. Additionally, structural variations made be effected in the design of the baghouse or the arrangement of the filter bags therein while still accommodating the improved bag tensioning apparatus of the present invention. It is intended, therefore, by the appended claims to cover any modifications that fall within the true spirit and scope of the invention limited only by the scope of the appended claims.

I claim:

1. In a filter apparatus for cleaning a gas laden with solid particles having a housing defining a filter chamber therein, a tube sheet having a plurality of openings therein and extending across the housing so as to divide the filter chamber into an inlet plenum and an outlet plenum, and a plurality of tubular fabric filter bags extending outwardly from the tube sheet, each filter bag having an open end mounted to one of said openings in the tube sheet and a closed end suspended from a support beam extending across the housing in spaced relationship to the tube sheet, an improved filter bag tensioning apparatus for suspending the filter bags from the support beam and holding the filter bags under a predetermined tension comprising: a hanger rod extending axially from the closed end of each filter bag through an aperture in the support beam; spring means disposed about each hanger rod for biasing each hanger rod axially relative to the support beam so as to hold each filter bag in a taut condition; compression means positioned and arranged with respect to the spring means for compressing said spring means to provide the desired bias; and tension release means for removing the compression on said spring means, said tension release means disposed about the hanger rod between said spring means and the support beam.

2. An apparatus as defined in claim 1 wherein the tension release means comprises a lever having a slotted substantially rectangular-shaped head and a lever arm extending therefrom, the slotted head of said lever disposed about the hanger rod between said spring means and the support beam.

* * * * *